United States Patent [19]

Ahlbom

[11] Patent Number: 4,541,049
[45] Date of Patent: Sep. 10, 1985

[54] METHOD FOR UPDATING IN A WHEELED VEHICLE STEERED BY DEAD RECKONING

[75] Inventor: Sten H. N. Ahlbom, Västra Frölunda, Sweden

[73] Assignee: AB Volvo, Gothenburg, Sweden

[21] Appl. No.: 307,700

[22] Filed: Oct. 1, 1981

[30] Foreign Application Priority Data

Oct. 2, 1980 [SE] Sweden ............................ 8006906

[51] Int. Cl.³ .............................................. B62D 1/28
[52] U.S. Cl. .................................. 364/424; 364/450; 180/168
[58] Field of Search ............... 364/424, 436, 444, 449, 364/450, 559; 180/167–169; 318/587; 73/178 R

[56] References Cited

U.S. PATENT DOCUMENTS

| | | | |
|---|---|---|---|
| 3,612,206 | 10/1971 | Ohntrup | 180/168 |
| 3,628,624 | 12/1971 | Wesener | 180/168 |
| 3,715,572 | 2/1973 | Bennett | 318/587 |
| 3,881,568 | 5/1975 | Ando et al. | 180/168 |
| 3,925,641 | 12/1975 | Kashio | 364/424 |
| 3,935,922 | 2/1976 | Cooper et al. | 180/168 |
| 4,278,142 | 7/1981 | Kono | 364/424 |
| 4,307,329 | 12/1981 | Taylor | 180/168 |
| 4,307,791 | 12/1981 | De Bruine | 180/168 |
| 4,309,758 | 1/1982 | Halsall et al. | 364/436 |
| 4,310,789 | 1/1982 | Mank et al. | 180/168 |
| 4,329,632 | 5/1982 | Yoshida et al. | 364/436 |
| 4,403,291 | 9/1983 | Von Tomkewitsch | 364/424 |
| 4,424,875 | 1/1984 | Yoshida | 364/424 |

FOREIGN PATENT DOCUMENTS 2459358 6/1975 Fed. Rep. of Germany ...... 180/168

Primary Examiner—Gary Chin
Attorney, Agent, or Firm—Pollock, Vande Sande & Priddy

[57] ABSTRACT

In a wheeled vehicle steered by dead reckoning, which calculates its own position on the basis of distances determined by rolling-off measurement, the error in position determination will increase gradually and necessitate updating. A floor is provided with markings which are observed by a linear detector mounted transversely in the vehicle, and linear images are obtained. At least two different measurements are carried out of the position of a marking in relation to the vehicle, and the distance travelled by the vehicle between the measurements is measured. From these three measured distances, the angle between the vehicle and the marking can be determined. An additional marking forming an angle with the first marking makes it possible to determine the position in the direction of movement of the vehicle as well.

3 Claims, 4 Drawing Figures

METHOD FOR UPDATING IN A WHEELED VEHICLE STEERED BY DEAD RECKONING

In my Swedish patent application No. 7900993-2 there is demonstrated a method of steering a vehicle to follow a certain trajectory which does not need to be marked on the supporting surface, by allowing the vehicle to be moved from a starting position and steering through roll-off measurement of its movement to derive distance and direction information. Making an analogy with the age-old principle of navigation on the open seas where there are no fixed points of reference, this method of steering has been called dead reckoning steering, and further described in this application.

As was mentioned in the previous application, it is not possible to steer a vehicle according to this principle indefinitely because unavoidable errors in following the intended path will gradually accumulate. It is true that in tests errors resulted of the order of only 10 cm after travelling 100 m with several turns, but it is still apparent that there is a need for updating. This is especially true if the vehicle is to function in a transport system with narrow warehouse aisles, where an accumulated error can cause collisions.

Thus the invention relates to a method of updating position data in a vehicle steered by dead reckoning, with the aid of markings arranged on the floor, there being in the vehicle a unit continuously updated by rolling-off means, said unit registering position and attitude information for the vehicle computed by dead reckoning.

The purpose of the invention is to achieve such updating with means which are as simple as possible. According to the invention, a linear detector is used, fixed securely to the vehicle and detecting a linear track or a marking on the floor. It is suitable to arrange one or more such markings in segments so that the vehicle will pass over one with acceptable frequency. A linear detector suited to this purpose must be able to determine its position in relation to the marking, in a form of a lateral deviation.

The use of an optical linear detector is primarily intended. Such detectors are known which comprise a row of light-sensitive detectors each of which can determine the presence or absence of a marking in an image of a portion of the supporting surface, preferably consisting of a narrow strip or slot transverse to the vehicle. In such a device it is suitable to carry out the measurement as a repeated sampling operation, whereby each time the distance is determined between the image of the line and the midpoint of the linear detector. It is also suitable to use some type of recognition operation to determine with high probability that the marking observed actually is the one intended and not a branch or refuse on the floor. For this purpose it is suitable to give the marking the shape of a recognizable line. An example of this is a marking consisting of two parallel stripes of different width, which are suitably recognized by a correlation method.

It is also possible to use a linear detector which is based on electromagnetic principles and detects markings designed for such sensing. A known type of such markings consists of an electric conductor placed in the floor, which conducts alternating current. The linear conductor can then consist of two detector coils, each of which measures an electromagnetic signal from the conductor. If the conductor lies directly beneath the centre of this linear detector, the two detector coils will receive signals of equal size, but the signals will differ if there is a lateral deviation. It is thus possible to obtain a measure of the lateral deviation, albeit as a rule with somewhat poorer precision than with said optical means.

The special advantages and characteristics achieved according to the inventive method for updating the vehicle position are obtained by virtue of the fact that the supporting surface is provided with a marking segment, comprising at least one straight line segment; that the vehicle has a linear detector arranged transversely thereto and that the vehicle when near the marking, an intersection of the linear detector with the marking is determined at least twice; that the distance between the two determined intersections is taken as a first distance; that the distance measured on the linear detector between the two points of intersection is taken as a second distance; and that from the two said distances, the angle is calculated between the vehicle and said straight line of the marking.

In accordance with a second aspect of the invention, the lateral deviation of the vehicle in relation to the straight line segment is measured by means of the linear detector. If such a lateral deviation is first measured in relation to a first line of the marking and thereafter, preferably after the vehicle has swung 90° from its position at the first measurement, a second measurement is made of the lateral deviation there, one can determine where the vehicle is in a given coordinate system. In general, the essential feature of the method is that by means of the markings which are read by a linear detector, it is possible to determine the actual position of the vehicle in the coordinate system defining all possible positions for the vehicle.

A precondition for obtaining a reliable and complete position updating by means of a single-line marking on the floor is that it be possible to determine not only the lateral deviation and direction, but also obtain a vehicle displacement along the length of the marking line. In accordance with a preferred embodiment, this can be done by arranging an additional line segment, which forms an angle with the first. It is then possible by two successive measurements of the two line segments, the distance between them varying as the vehicle moves, to determine for example where the vehicle is located in relation to a point of intersection of these two line segments. It is not necessary that either of the line segments physically extend to the point of intersection. It is also possible to arrange two intersecting lines in the form of a triangle point and in an analogous manner determine where the vehicle is by having the linear detector measure at two successive times the intersection of the two lines with the line detector, which will provide an unambiguous location of the vehicle.

It is known to arrange dead reckoning steering in such a manner that the vehicle is normally steered along some type of path, e.g. a curved loop, from which the vehicle deviates under dead reckoning steering, and then returns to the curved loop. What happens here is not actual updating, but approach steering. The essential feature of the invention however is the obtaining of new coordinate values, and the steps taken therefore need not necessarily consist of steering into a marked path; rather, correction can be done gradually or by making a subsequent turn earlier or later. This has the advantage that the markings according to the invention can be relatively short or limited, since the intention here is not steering-in but updating vehicle position information.

Although according to a preferred embodiment it is suitable to arrange a single-linear detector in the vehicle and make two successive measurements while the vehicle is in motion, it is also possible to arrange two different parallel linear detectors, at a known distance apart to make a measurement.

Although it is presently preferred to obtain the complete coordinates of the vehicle for updating by merely taking measurements to line markings by means of a one-dimensional linear detector, or alternatively two parallel linear detectors, it is also possible to obtain a distance reading along a line by special distance markings. These can of course consist of the beginning or end of the marking, but if one wishes to work with a sampling linear detector, which only takes "momentary pictures" at certain intervals, this would produce a possible longitudinal error corresponding to the distance between two samplings; and therefore it can be suitable to arrange a separate longitudinal sensing, e.g. in the form of ferromagnetic markings. This can be done in many different ways, and is dependent on local conditions. In many cases the floor may contain iron objects placed there for other purposes, and a steel entranceway in a door can often serve as a distance marker if it is sensed with magnetic means. It is also possible to arrange a separate marking, e.g. small permanent magnets laid in the floor, which when passed over trigger a marking signal identifying the point of reference, which supplements the measurements of lateral deviation with a linear detector. It will thus be understood that there are enumerable variations possible within the scope of the present inventive idea.

The invention will now be described in more detail with reference to an example.

DESCRIPTION OF PREFERRED EMBODIMENT

Figure 1:
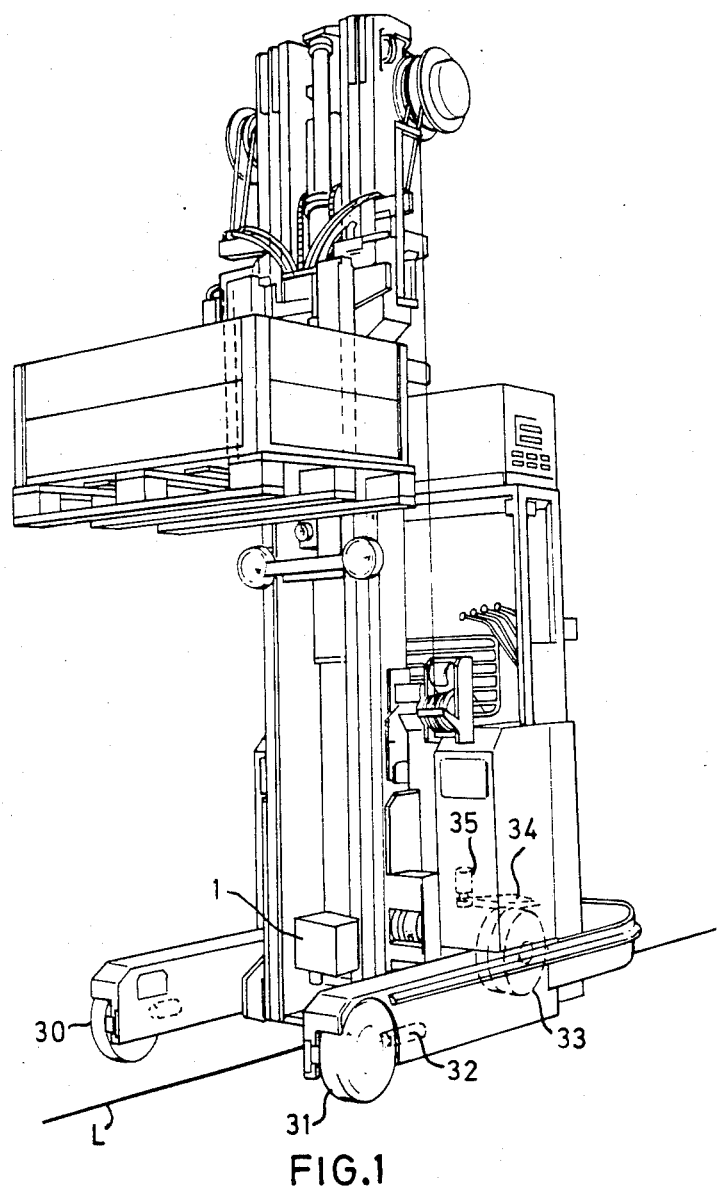
Figure 2:
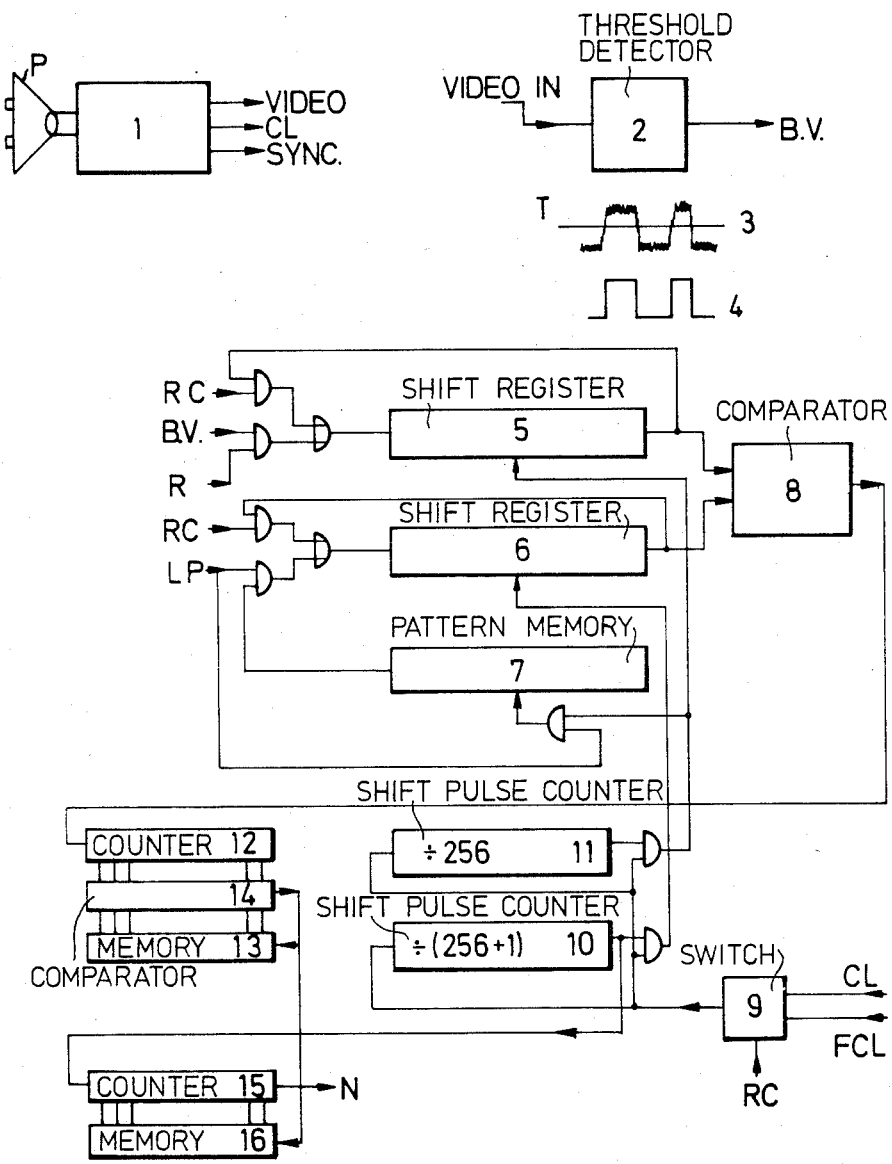
Figure 3:
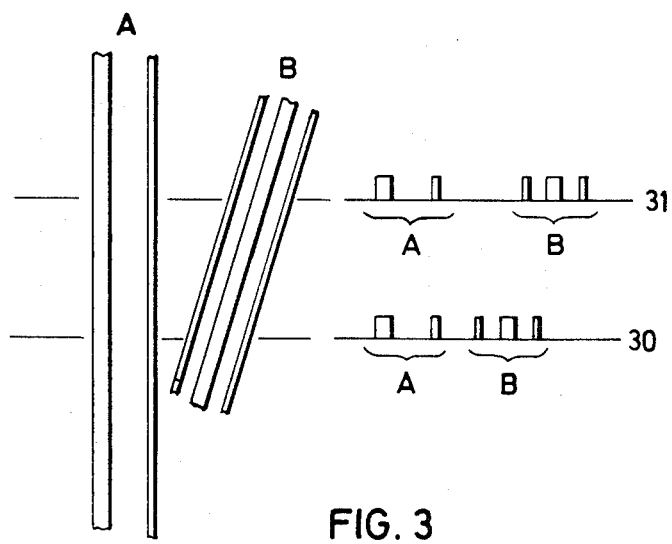
Figure 4:
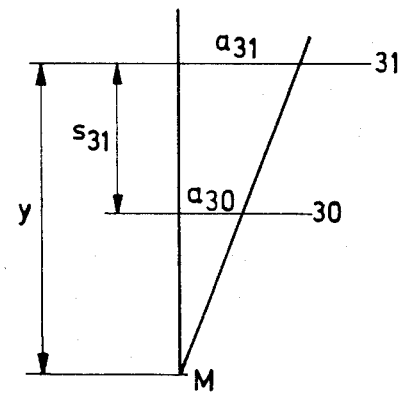

FIG. 1 shows a vehicle for applying the invention.
FIG. 2 shows a block diagram and wave patterns.
FIG. 3 shows an example with intersecting markings.
FIG. 4 shows schematically with reference to FIG. 3 how the intersection of the markings can be determined.

FIG. 2 shows schematically an example of a devide for recognizing the position on the floor of a line pattern. A video camera 1 is directed towards the floor, which displays the linear pattern P transverse to the camera. The video camera 1 is suitably a single-row photodiode matrix, e.g. manufactured by Reticon, and divides a line into 256 elements. A video signal is emitted, consisting of an analog signal for each element. The video signals are conducted to a threshold detector 2, which emits binary signals; i.e. 256 bits are emitted, which are 0 or 1 depending on whether the intensity is sufficient to indicate the presence of the marking in the photo-element. 3 represents a video signal prior to digitalization, with the threshold value T drawn in, and 4 shows the resulting binary video signal. This signal, designated BV, is read via a gate system into a binary shift register 5 with 256 bits. An ideal pattern, corresponding to the expected configuration (here two lines of different width) is read into a pattern memory 7 comprising a shift register. To determine lateral deviation, a correlation operation is now carried out.

If the pattern of the video signal is "centered" in the camera, shift register 5 and shift register 7 should in principle contain identical bit series. Through a special comparison which will be described, a lateral deviation can be determined.

As can be seen from FIG. 2, there are two different clock signals, namely the signal CL coming from the camera 1 and synchronized with the video signal, and a fast clock signal FCL which is used for transferring and coordinating purposes. For reading the video signal BV into the shift register 5, the signal CL is used, which is introduced via the switch 9, and under the control of a shift-pulse counter 11, which shuts off when all of the 256 bits have been read in, and under the control of a control signal R.

For comparison, the fast clock signal FCL is applied under the control of the shift-pulse counter 11 to the clock input on the shift register 5 and under the control of the shift-pulse counter 10 to the clock input of the shift register 6. The signals coming from the shift registers each go to an individual input of a comparator 8, and are also recirculated under the control of a recirculating signal RC, so as to circulate the respective shift registers. For each bit pair, the comparator sends a signal upon agreement, and the agreement signals are counted in a counter 12, which is provided with parallel outputs coupled to a comparator 14, which is also coupled to a memory 13.

Due to the fact that the shift-pulse counter 10 has a division factor (256+1), it will produce an output signal one pulse later, so that the shift register 6 will be shifted one pulse for each circulation. This 257th pulse continues to a pulse counter 15 which counts the number of separate comparisons, and after 256 cycles generates a stop signal.

For each cycle, the number of agreements signalled from the comparator 8 is counted, and if the number of agreements exceeds the number stored in the memory 13, the comparator 14 will write the higher number to the memory 13. At the same time, the number in the counter 15 is written into the memory 16. When the pulse counter 15 is full, when 256 comparisons have been made, thee will be a number in the memory 16 which corresponds to the displacement between the shift registers 5 and 6 which provides the best correlation between the contents of the registers. It is then known how the pattern P lies in relation to the scanning field of the camera 1, at the same time as a ready-signal N is emitted from the pulse counter 15.

It is obvious that the control signals must be taken from a separate control unit which determines the operational sequence by sending signals R and LP at the beginning of each sampling sequence and then requesting a comparison by the signal RC. The sampling result can then be taken from the memory 16 as a measure of the lateral error; for example so that the number 128 designates that the camera/vehicle is directly over the marking (the position of the index point), a lower number indicating a lateral deviation to the left and a higher number a lateral deviation to the right of the index point. With the foregoing analysis, comparison of the video signal output with a stored signal pattern will result in determining the relative positional deviation of the camera/vehicle with respect to the known position of the sensed floor marking.

Although this description of the sequence is general, it will enable the electronics engineer familiar with microcircuits to construct with standard components a suitable apparatus.

After explaining how a lateral deviation is measured in relation to the linear detector 1 and thus to the vehicle, it will now be explained how the position of the vehicle in the direction of motion is measured according to a special aspect of the invention.

FIG. 3 shows an example with two different line segment patterns A and B on the floor transversed by the vehicle. Pattern A is assumed to fall along the path of the vehicle, while pattern B forms an angle with pattern A. FIG. 3 shows schematically at lines 30 and 31 corresponding to first and second positions of the vehicle, how the video signals appear when the camera is directed at them. Two video signal patterns resulting from the camera viewing patterns A and B appear side by side. Referring to what was said with respect to FIG. 2, if video signal pattern A is the pattern stored in the pattern memory 7, then this pattern will provide the best correlation, thus providing a value of the lateral deviation of the vehicle with respect to the floor pattern A, with the existence of floor pattern B at most resulting in a certain reduction of the highest number of correspondences in the comparator 8.

In the measurement to be made according to FIG. 3, a corresponding lateral deviation must be obtained for pattern B with respect to the vehicle position. Although this can be done in another operation with the same apparatus, it is preferable to duplicate the apparatus in FIG. 2 and to store pattern B in the memory 7 of the duplicate apparatus. After a completed cycle, the lateral deviation for pattern B with respect to the video signal pattern will be stored in the corresponding memory 16 in the form of a number between 0 and 256.

For each sampling, such as the samplings 30,31 in FIG. 3, the distance detected between the paterns A and B is computed, and this number is obtained by taking the difference between the numbers in the two memories corresponding to memory 16 in FIG. 2. Successive values are stored together with the values of the distance on the floor between the samplings. The distance on the floor between positions A30, A31 are determined from measuring the rotation of the vehicle wheels, and calculated from this rotation the vehicle displacement. These rolled off measurements in the aforesaid Swedish Application, corresponding to U.S. patent application Ser. No. 451,509, filed Dec. 20, 1982.

In principle it is possible to know the position of the vehicle after two samplings at two discreet positions 30, 31. If the difference between the numbers according to the sampling at position 30 in FIG. 3 is called $a_{30}$ and the corresponding number for the sampling at position 31 is called $a_{31}$, and the rolled-off distance between positions 30,31 in the direction of motion of the vehicle is called $s_{31}$, the elementary geometrical relation of two similar triangles reveals that $$\frac{y - s_{31}}{y} = \frac{a_{30}}{a_{31}},$$

which when solved for y gives $$y = \frac{s_{31}}{\left(1 - \frac{a_{30}}{a_{31}}\right)}$$

where y is the distance between the point of intersection M of the floor patterns and the sampling position 31 in FIGS. 3 and 4. It is thus possible to determine the actual position of the vehicle, if y and the lateral error for the pattern A at sampling 31 are known, and it is thus possible to update the value which the vehicle "believes" is its position as calculated by rolled-off measurements according to the dead reckoning method.

After having described the principle method for recognition of markings, a few words should be said concerning redundant methods. It is obvious that the pattern may be misread at some time, because something else is mistaken for the pattern. One should note, however, that in the circulation according to FIG. 2, after comparison between the pattern in the memory 7 and the image in the memory 5, a number will be stored in the counter 13, which will be a kind of quality factor number. It is then possible to reject or accept measurements depending on whether this quality factor number exceeds a certain threshold value. In a compensation method based on the least-squares method, it is also possible to use the quality factor numbers as weighting numbers.

Instead of using successively measured values, it is also possible to use sliding averages, both for determining the lateral deviation of the vehicle and its attitude. A person skilled in statistical methods will be able using such principles to formulate suitable computer programs without difficulty, when he has knowledge of the principle of the invention. The principle chosen depends largely on the computer which one wishes to incorporate into the apparatus. Significant savings can be achieved in this respect by taking sliding averages. We will now describe the detailed interaction with the dead reckoning method with reference to an example. It is assumed that a truck steered by dead reckoning, e.g. a truck described in the patent application mentioned in the introduction, is started from a known position with the attitude angle $\phi$ and coordinates x and y all set at 0. The assumed coordinate system here is not a Cartesian system but a path-centered system, where x denotes the lateral deviation of the truck from a trajectory and y is a measure of the rolled-off distance along said imaginary, non-physical trajectory.

Dead reckoning will now provide the truck at each instant with computed values of $\phi$, x and y. These values will gradually become less reliable because of the cumulative errors. Therefore markings are arranged somewhere along the path, for example those revealed in FIG. 3.

When dead reckoning produces a value, especially the value of rolled-off distance y, which corresponds to the position of the marking, the recognition and updating sequence is initiated. As stated above, a value of the distance travelled, corresponding to y, and a value of the lateral error x are obtained.

At least two lateral error values in combination with short intermediate distances of travel will provide a value for the attitude $\phi$.

These values can now replace the values obtained by dead reckoning.

It is also possible to compute and save for later correction the difference between the dead reckoning position and the updated position. From a series of such differences it is possible to compute systematic errors. For example, the rolled-off values can be erroneous because the effective wheel circumference is less than calculated, either because of wear or due to the effect of the load. Such errors can then be compensated for.

As was mentioned in the introduction, it is also possible to carry out the updating without the use of angled markings, if the lateral error is measured relative to two different markings with, for example, a 90° turn between them. If the first update is for x and φ, the lateral error measured after the turn will correspond to the actual longitudinal error in the path, and this measurement can be used for correcting y.

FIG. 1 shows a fork-lift truck which is steered according to the invention. A pair of lines L is painted on the floor, and a linear detector 1 is directed at it. For dead reckoning navigation, the two supporting wheels 30 and 31 are provided with sensors 32 which emit signals when the teeth of gears fixed to the wheels pass by said sensors, to give a measure of the rolled-off distance. As described in the above-mentioned Swedish patent application, dead reckoning can be done on the basis of signals from these sensors 32 (of which only one is shown), and steering is normally accomplished via the steering wheel 33, which is coupled via a connector member 34 to a steering means 35, which sets a steering angle δ. In accordance with the invention, the steering angle δ can now be set via the steering means 35, based on the values φ and Δx taken from dead reckoning, when the vehicle is functioning according to the dead reckoning method. The dead reckoning variables can now be replaced according to the invention with fresh or updated values obtained from passage over a marking.

What I claim is:

1. In a wheeled vehicle steered by a method of dead reckoning whereby said vehicle computes a position and attitude from rolled off distance measurements, a method for determining said vehicle position and attitude for said dead reckoning method by sensing the vehicle position with respect to a linear marking having a known position in a coordinate system for said vehicle on a surface traversed by said vehicle comprising:

utilizing a linear detector attached to said vehicle in a direction transverse to the direction of movement of said vehicle to measure two consecutive positions of said vehicle with respect to said linear marking, said consecutive positions providing two consecutive intersections between said linear marking and said linear detector;

determining an undeviated rolled off first distance between said consecutive positions;

determining a second distance corresponding to the distance between the points of intersection of said linear detector and said linear marking at said two measured consecutive positions; and, determining from said first and second distances an angle between said linear marking and said vehicle, whereby said vehicle position with respect to said linear marking is known, indicating the vehicle position in said coordinate system.

2. In a vehicle steered by a method of dead reckoning whereby said vehicle computes a position and attitude from rolled off distance measurements, a method for determining said vehicle position and attitude for said dead reckoning method by sensing the vehicle position with respect to a linear marking having a known position in a coordinate system for said vehicle on a surface traversed by said vehicle comprising:

measuring the lateral deviation of said vehicle with respect to said linear marking with first and second linear detectors, said linear detectors being attached to said vehicle and spaced apart at a known distance and parallel to each other in a direction transverse to said vehicle direction of movement, said lateral deviation being determined from the distance between the points of intersection of said linear marking and said linear detectors; and determining the attitude of said vehicle from said lateral deviation and said known distance between said linear detectors.

3. In a wheeled vehicle steered by a method of dead reckoning, whereby said vehicle computes a position and attitude from rolled off distance measurements representing linear motion of said vehicle, a method for updating said vehicle position coordinates by detecting said vehicle position with respect to first and second linear markings which intersect each other on the surface supporting said vehicle comprising:

optically scanning said surface with a linear detector positioned on said vehicle to determine positional points on said detector intersected by said linear markings;

determining, at first and second positions of said vehicle, the intersection of each of said first and second linear markings with said linear detector, each of said intersections representing a lateral deviation of each of said linear markings with respect to said vehicle at said first and second positions;

determining the difference in lateral deviation between each of said markings and said vehicle at each of said positions whereby first and second differences in lateral deviation A30, A31, for each of said positions are determined;

measuring the rolled off distance S31 traversed by said vehicle between said first and second positions; and, determining the distance Y between one of said vehicle positions and the intersection of said first and second linear markings from said rolled off distance S31 and said differences in lateral deviation A30, A31, whereby said vehicle position with respect to said intersection of said linear markings is determined.

* * * * *